(12) United States Patent
Ishii et al.

(10) Patent No.: US 8,964,150 B2
(45) Date of Patent: Feb. 24, 2015

(54) LIQUID CRYSTAL DISPLAY DEVICE AND METHOD OF MANUFACTURING THE SAME

(75) Inventors: Akira Ishii, Mobara (JP); Setsuo Kobayashi, Mobara (JP); Katsuhiko Ishii, Chosei (JP); Shinji Tanabe, Mobara (JP); Kiyoshi Sento, Sakura (JP)

(73) Assignee: Japan Display Inc., Tokyo (JP)

( * ) Notice: Subject to any disclaimer, the term of this patent is extended or adjusted under 35 U.S.C. 154(b) by 137 days.

(21) Appl. No.: 13/547,080

(22) Filed: Jul. 12, 2012

(65) Prior Publication Data

US 2013/0016311 A1    Jan. 17, 2013

(30) Foreign Application Priority Data

Jul. 13, 2011   (JP) .................. 2011-154519

(51) Int. Cl.
*G02F 1/1333* (2006.01)
(52) U.S. Cl.
CPC ........... *G02F 1/133308* (2013.01); *G02F 2001/133331* (2013.01); *G02F 2202/28* (2013.01)
USPC ............................. 349/122; 349/12
(58) Field of Classification Search
CPC .............. G02F 1/133; G02F 1/13335
USPC ............................. 349/122
See application file for complete search history.

(56) References Cited

U.S. PATENT DOCUMENTS

| 2009/0096756 | A1* | 4/2009 | Lube | 345/173 |
| 2009/0237602 | A1* | 9/2009 | Kubota et al. | 349/122 |
| 2010/0295812 | A1* | 11/2010 | Burns et al. | 345/174 |
| 2011/0012852 | A1* | 1/2011 | Takahashi | 345/173 |
| 2011/0032205 | A1* | 2/2011 | David | 345/173 |
| 2011/0095999 | A1* | 4/2011 | Hayton | 345/173 |
| 2011/0285640 | A1* | 11/2011 | Park et al. | 345/173 |
| 2012/0127094 | A1* | 5/2012 | Jeong | 345/173 |

FOREIGN PATENT DOCUMENTS

| CN | 101470291 | 7/2009 |
| CN | 101510382 | 8/2009 |
| JP | 2009-229538 | 10/2009 |
| KR | 10-2007-0119225 | 12/2007 |
| KR | 10-2011-0006622 | 1/2011 |

OTHER PUBLICATIONS

Office Action in corresponding Chinese Patent Application No. 201210244698.2, dated Jul. 3, 2014, English translation thereof.

* cited by examiner

*Primary Examiner* — Edward Glick
*Assistant Examiner* — Sang V Nguyen
(74) *Attorney, Agent, or Firm* — Antonelli, Terry, Stout & Kraus, LLP.

(57) ABSTRACT

Provided is a liquid crystal display device, including: a liquid crystal display panel; a plate-shaped component having a light permeable region, the plate-shaped component being disposed so as to face a display surface of the liquid crystal display panel; a pressure sensitive adhesive layer having light permeability, which is adhered under pressure onto the display surface of the liquid crystal display panel; and an adhesive layer having light permeability, which is adhered onto a surface of the plate-shaped component facing the display surface, in which the plate-shaped component is mounted on the liquid crystal display panel through intermediation of the pressure sensitive adhesive layer and the adhesive layer.

5 Claims, 2 Drawing Sheets

LIQUID CRYSTAL DISPLAY DEVICE AND METHOD OF MANUFACTURING THE SAME

CROSS-REFERENCE TO RELATED APPLICATION

The present application claims priority from Japanese application JP 2011-154519 filed on Jul. 13, 2011, the content of which is hereby incorporated by reference into this application.

BACKGROUND OF THE INVENTION

1. Field of the Invention

The present invention relates to a liquid crystal display device and a method of manufacturing the same.

2. Description of the Related Art

There is known a liquid crystal display device having a structure in which a plate-shaped component such as a surface plate or a touch panel is bonded onto a liquid crystal display panel. For the bonding, a UV-curable adhesive is used. In this method, a thickness distribution of the UV adhesive deteriorates due to the influence of warpage and deformation of the plate-shaped component and the liquid crystal display panel and the parallelism of the bonded devices. Accordingly, a difference occurs in shrinkage amount in the course of cure, and due to the action thereof, a stress is applied to the liquid crystal display panel to cause display unevenness. As a countermeasure, it is conceivable to alleviate the stress by increasing the thickness of the UV adhesive, but there is a problem that the UV adhesive flows out from a bonded end surface because of the fluidity of the UV adhesive after bonding. Further, in the case of bonding a surface plate subjected to printing in a frame shape, a difference occurs in degree of cure of the UV adhesive because of a difference in light amount of UV light between a printing portion and a transparent portion. Similarly to the above, a liquid crystal display panel substrate is deformed due to a difference in stress applied to the liquid crystal display panel to cause display unevenness.

As a countermeasure, there has been devised a bonding process that uses a double-sided pressure sensitive adhesive sheet which eliminates the thickness difference at a bonded portion and does not need a cure process. However, an adhered member is adhered by the double-sided pressure sensitive adhesive sheet and hence cannot be moved after bonding. Accordingly, there has been a drawback that highly-accurate bonding needs an expensive device provided with an alignment mechanism. Further, in the case where a sheet having no base material is used as the double-sided pressure sensitive adhesive sheet, the cohesion force is high and hence it is difficult to peel off the sheet after bonding. Accordingly, there has been another drawback that the reparability such as the reuse of a component in the process is significantly deteriorated. As means for solving the problems, there has been devised a liquid crystal display device which uses a double-sided pressure sensitive adhesive sheet in which a PET sheet is provided as a base material and adhesives are provided on both surfaces thereof (Japanese Patent Application Laid-open No. 2009-229538).

In the above-mentioned method, the base material is present in the pressure sensitive adhesive sheet, and hence air bubbles are apt to be generated due to a step at a frame-shaped printing portion formed on a surface plate. Accordingly, it has been necessary, to reduce a printing step or increase the thickness of the pressure sensitive adhesive layer, which requires a wide range of restrictions.

SUMMARY OF THE INVENTION

The present invention has an object to provide a liquid crystal display device in which color unevenness does not occur in a liquid crystal display panel even when a plate-shaped component is bonded thereto, and a method of manufacturing the liquid crystal display device.

(1) A liquid crystal display device according to the present invention includes: a liquid crystal display panel; a plate-shaped component having a light permeable region, the plate-shaped component being disposed so as to face a display surface of the liquid crystal display panel; a pressure sensitive adhesive layer having light permeability, which is adhered under pressure onto the display surface of the liquid crystal display panel; and an adhesive layer having light permeability, which is adhered onto a surface of the plate-shaped component facing the display surface, in which the plate-shaped component is mounted on the liquid crystal display panel through intermediation of the pressure sensitive adhesive layer and the adhesive layer. According to the present invention, fluctuations in cure shrinkage amount of the adhesive layer can be absorbed by the pressure sensitive adhesive layer, and hence the occurrence of color unevenness in the liquid crystal display panel can be suppressed.

(2) The liquid crystal display device according to item (1) may further include a resin plate having light permeability, which is interposed between the pressure sensitive adhesive layer and the adhesive layer, the pressure sensitive adhesive layer may be adhered under pressure onto the resin plate, and the adhesive layer may be adhered onto the resin plate.

(3) In the liquid crystal display device according to item (1), the pressure sensitive adhesive layer and the adhesive layer may be in contact with each other.

(4) In the liquid crystal display device according to any one of items (1) to (3): the plate-shaped component may include a plate member having light permeability, and a light shielding layer which is laminated on the plate member so as to avoid facing at least a center portion of a surface of the plate member on the liquid crystal display panel side; and the adhesive layer may be adhered onto the plate-shaped component so as to cross a border between the center portion of the plate member and the light shielding layer.

(5) In the liquid crystal display device according to any one of items (1) to (3), the plate-shaped component may be a touch panel.

(6) In the liquid crystal display device according to any one of items (1) to (5): the liquid crystal display panel may include at least a polarizing plate on the display surface side; and the pressure sensitive adhesive layer may be adhered onto the polarizing plate.

(7) A method of manufacturing a liquid crystal display device according to the present invention includes: forming a pressure sensitive adhesive layer having light permeability on a display surface of a liquid crystal display panel; bonding, onto the pressure sensitive adhesive layer, a plate-shaped component having a light permeable region through intermediation of a liquid adhesive having light permeability; moving, before the liquid adhesive is cured, the plate-shaped component to adjust a position of the plate-shaped component; and curing the liquid adhesive to form an adhesive layer. According to the present invention, fluctuations in cure shrinkage amount of the liquid adhesive can be absorbed by the pressure sensitive adhesive layer, and hence the occurrence of color unevenness in the liquid crystal display panel can be suppressed. Further, the position of the plate-shaped component can be adjusted before the liquid adhesive is cured, and hence an assembling process is performed more easily.

DETAILED DESCRIPTION OF THE INVENTION

Figure 1:
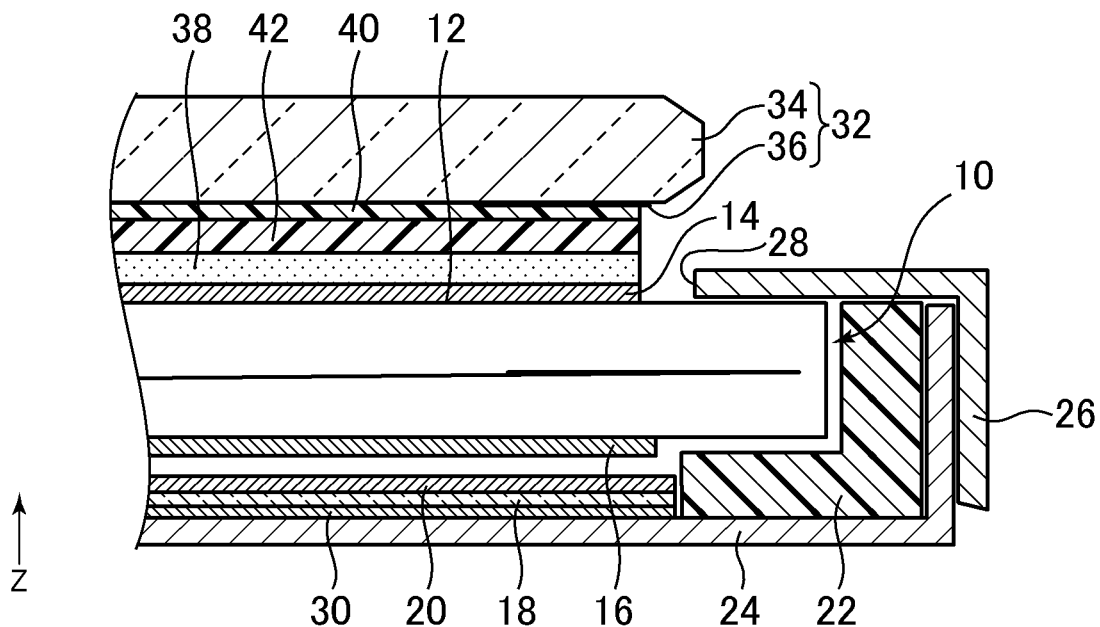
FIG. 1 is a cross-sectional view of a liquid crystal display device according to an embodiment of the present invention.

Hereinafter, an embodiment of the present invention is described with reference to the accompanying drawings. FIG. 1 is a cross-sectional view of a liquid crystal display device according to the embodiment of the present invention.

The liquid crystal display device includes a liquid crystal display panel 10. The liquid crystal display panel 10 includes a pair of substrates (both are glass substrates), and liquid crystal (not shown) is interposed between the substrates. One of the substrates is a thin film transistor (TFT) substrate (or an array substrate) including thin film transistors, pixel electrodes, wiring, and the like. The other substrate is a color filter substrate. The liquid crystal display panel 10 may employ any drive mode including an in-plane switching (IPS) mode, a twisted nematic (TN) mode, and a vertical alignment (VA) mode. The electrodes and wiring are formed in correspondence with the employed mode.

The liquid crystal display panel 10 includes at least a polarizing plate 14 on a front surface 12 side (front side) which is an image display surface. In the example of FIG. 1, a polarizing plate 16 is also bonded on a back surface side (back side) which is opposite to the front surface 12 of the liquid crystal display panel 10.

The liquid crystal display device includes a backlight unit on the back surface side of the liquid crystal display panel. The backlight unit includes a light source (not shown) (such as a light emitting diode) and a light guide plate 18. The light guide plate 18 is stacked on the liquid crystal display panel 10. The light guide plate 18 converts light from the light source which is a point light source into a planar light source, and illuminates the liquid crystal display panel 10. An optical sheet 20 is disposed between the liquid crystal display panel 10 and the light guide plate 18.

The liquid crystal display device includes a resin frame 22 for supporting the liquid crystal display panel 10. The resin frame 22 is formed by resin molding. The liquid crystal display device includes a metal frame 24 for accommodating the liquid crystal display panel 10, the resin frame 22, the light guide plate 18, and the light source (not shown). The resin frame 22 is held by being fitted into the metal frame 24. An upper metal frame 26 is fitted outside the metal frame 24 disposed below the accommodated components. The upper metal frame 26 includes an opening 28 so as to dispose the front surface 12 of the liquid crystal display panel 10 on an inner side of the liquid crystal display device.

A reflection sheet 30 is disposed on the back surface side of the light guide plate 18 (on the side opposite to the optical sheet 20). The reflection sheet 30 allows light emitted from the light guide plate 18 in the direction opposite to the liquid crystal display panel 10 to return to the light guide plate 18. The reflection sheet 30 is also accommodated in the metal frame 24.

A plate-shaped component 32 having a light permeable region is disposed so as to face the front surface 12 of the liquid crystal display panel 10. The plate-shaped component 32 illustrated in FIG. 1 includes a plate member 34 having light permeability (such as a glass substrate), and a light shielding layer 36 which is laminated on the plate member 34 so as to avoid facing at least a center portion (such as an image display region) of the surface of the plate member 34 on the liquid crystal display panel 10 side. The plate member 34 serves as a reinforcing plate of the liquid crystal display panel 10. The light shielding layer 36 is a portion formed by printing. The light shielding layer 36 has a design function and also a function of blocking light that leaks to the outside of the image display region. The light shielding layer 36 has a thickness, and hence there is a difference in height (step) between the surface of the plate member 34 on the back surface side and the surface of the light shielding layer 36 on the back surface side. Accordingly, irregularities are formed on the surface of the plate-shaped component 32 on the back surface side.

On the front surface 12 of the liquid crystal display panel 10 (such as the surface of the polarizing plate 14), a pressure sensitive adhesive layer 38 having light permeability is adhered under pressure. The pressure sensitive adhesive layer 38 has flexibility and pressure sensitive adhesiveness. The pressure sensitive adhesive layer 38 is adhered onto the polarizing plate 14.

On the surface of the plate-shaped component 32 facing the front surface 12, an adhesive layer 40 having light permeability is adhered. The adhesive layer 40 is in a cured state. The adhesive layer 40 illustrated in FIG. 1 is thinner than the pressure sensitive adhesive layer 38 (for example, ½ or less), but the adhesive layer 40 and the pressure sensitive adhesive layer 38 may have the same thickness.

The adhesive layer 40 is adhered onto the plate-shaped component 32 so as to cross a border between the center portion (such as a region opposed to the image display region) of the plate member 34 and the light shielding layer 36. The adhesive layer 40 has a difference in thickness (irregularities) corresponding to the irregularities formed by the difference in height (step) between the surface of the light shielding layer 36 and the surface of the plate member 34. In other words, the adhesive layer 40 is adhered also on a side surface of the light shielding layer 36 which rises from the plate member 34 (the surface of the light shielding layer in the thickness direction). Therefore, no air bubbles are present in adjacent to a convex portion formed by the light shielding layer 36, or even if air bubbles are present, the size of the air bubbles is minute.

A resin plate 42 having light permeability is interposed between the pressure sensitive adhesive layer 38 and the adhesive layer 40. The resin plate 42 is made of, for example, a polyethylene terephthalate (PET) resin. The resin plate 42 itself exerts neither adhesiveness nor pressure sensitive adhesiveness. On the resin plate 42, the pressure sensitive adhesive layer 38 is adhered under pressure and the adhesive layer 40 is adhered.

The plate-shaped component 32 is mounted on the liquid crystal display panel 10 through the intermediation of the pressure sensitive adhesive layer 38 and the adhesive layer 40. The pressure sensitive adhesive layer 38 is adhered under pressure onto a surface of the resin plate 42 on the liquid crystal display panel 10 side (that is, the front surface of the resin plate 42), and the adhesive layer 40 is adhered onto a surface of the resin plate 42 on the plate-shaped component 32 side (that is, the back surface of the resin plate 42). When a UV-curable adhesive is used as the adhesive layer 40, the adhesive layer 40 has an internal stress by cure shrinkage. Further, a cure shrinkage amount of the adhesive layer 40 is not uniform because the light shielding layer 36 is provided and hence the thickness of the adhesive layer 40 is non-uniform. However, according to this embodiment, fluctuations in cure shrinkage amount of the adhesive layer 40 can be absorbed by the pressure sensitive adhesive layer 38 and the resin plate 42, and hence the occurrence of color unevenness in the liquid crystal display panel 10 can be suppressed.

The difference between the pressure sensitive adhesive layer 38 and the adhesive layer 40 in this embodiment is described. The pressure sensitive adhesive layer 38 is originally high in viscosity, and has pressure sensitive adhesiveness and elasticity even after bonding. On the other hand, the adhesive 40 is liquid when applied, and is cured when subjected to external energy, such as ultraviolet rays or heat.

Next, a method of manufacturing a liquid crystal display device is described. In the manufacturing process, the liquid crystal display panel 10 is prepared. Then, the pressure sensitive adhesive layer 38 having light permeability is formed on the front surface 12 of the liquid crystal display panel 10. For example, a pressure sensitive adhesive sheet having the resin plate 42 as a base material and having the pressure sensitive adhesive layer 38 formed on its one surface is bonded onto the liquid crystal display panel 10. The pressure sensitive adhesive layer 38 can be peeled off even after being adhered under pressure. In particular, the pressure sensitive adhesive sheet in which the resin plate 42 and the pressure sensitive adhesive layer 38 are integrated is superior in reparability because it is easy to peel off with the resin plate 42 serving as a base material. Further, because the resin plate 42 is used as a base material, it is easy for an operator to handle. However, in the state in which the pressure sensitive adhesive sheet is brought into contact with the liquid crystal display panel 10, it is difficult to adjust the planar positions of the pressure sensitive adhesive sheet and the liquid crystal display panel 10. In the state in which the pressure sensitive adhesive sheet is bonded onto the liquid crystal display panel 10, it is difficult to correct a deviation in the X-Y direction of FIG. 4. Therefore, it is preferred that the resin plate 42 do not need fine alignment. For example, it is preferred that no wiring and the like be formed on the resin plate 42. The resin plate 42 is disposed for protecting the liquid crystal display panel 10 from the cure shrinkage of a cured ultraviolet curable resin applied onto the resin plate 42.

Next, the plate-shaped component 32 is bonded. For example, in the case of using a liquid adhesive having light permeability, the liquid adhesive is applied onto at least one of the plate-shaped component 32 and the resin plate 42, and the plate-shaped component 32 is bonded onto the resin plate 42. The liquid adhesive is, for example, a UV-curable adhesive or a thermosetting adhesive. The liquid adhesive is liquid, and hence a concave portion is formed, which corresponds to the convex portion of the plate-shaped component 32 formed by the light shielding layer 36. In other words, no air bubbles are present in adjacent to the convex portion, or even if air bubbles are present, the size of the air bubbles is minute. Further, before the liquid adhesive is cured, the plate-shaped component 32 can be moved in the X-Y direction illustrated in FIG. 4 to adjust the position thereof. After that, the liquid adhesive is cured to form the adhesive layer 40.

According to this embodiment, fluctuations in cure shrinkage amount of the liquid adhesive can be absorbed by the pressure sensitive adhesive layer 38 and the resin plate 42, and hence the occurrence of color unevenness in the liquid crystal display panel 10 can be suppressed. Further, the position of the plate-shaped component can be adjusted before the liquid adhesive is cured, and hence an assembling process is performed more easily.

Liquid crystal is disposed in a space surrounded by the color filter substrate, the TFT substrate, and a sealing material. Further, there are the following two kinds of representative method of manufacturing the liquid crystal display panel 10. In the first manufacturing method, an opening is provided in part of the sealing material which is disposed so as to surround the display region, and liquid crystal is injected from the opening in a vacuum, and after that, the opening of the sealing material is encapsulated by an encapsulating material. In the second manufacturing method, a continuous sealing material is formed on one substrate, and liquid crystal is injected therein, and after that, the other substrate is stacked onto the one substrate. In the liquid crystal display panel 10 manufactured by the second manufacturing method, the sealing material has no opening, and no encapsulating material is provided. The second manufacturing method can be performed in atmospheric pressure. However, the liquid crystal display panel 10 manufactured by the second manufacturing method is vulnerable to a force in the Z direction and is apt to deform. In other words, the thickness of a liquid crystal layer is apt to deform against the force in the Z direction.

In the case where this embodiment is applied, even when the plate-shaped component 32 is bonded onto the liquid crystal display panel 10 manufactured in atmospheric pressure, the occurrence of color unevenness resulting from the change in thickness of the liquid crystal layer can be suppressed.

Figure 2:
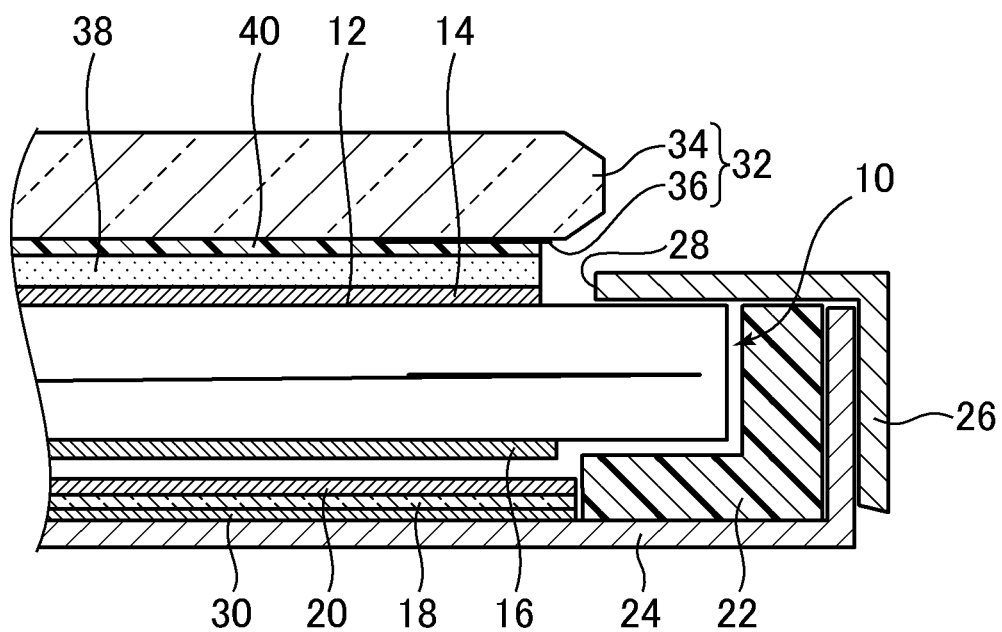
FIG. 2 is a cross-sectional view illustrating a first modified example of the embodiment of the present invention.

FIG. 2 is a cross-sectional view illustrating a first modified example of the embodiment of the present invention. In the first modified example, the pressure sensitive adhesive layer 38 and the adhesive layer 40 are in contact with each other. In other words, the resin plate 42 illustrated in FIG. 1 is omitted. The other configurations correspond to the contents of the above-mentioned embodiment. Also in this example, fluctuations in cure shrinkage amount of the adhesive layer 40 can be absorbed by the pressure sensitive adhesive layer 38, and hence the occurrence of color unevenness in the liquid crystal display panel 10 can be suppressed.

A method of manufacturing a liquid crystal display device in this modified example is different from that of the above-mentioned embodiment in that, when the plate-shaped component 32 is bonded, a liquid adhesive is provided directly on the pressure sensitive adhesive layer 38. The other contents are in common to the manufacturing method of the above-mentioned embodiment. Note that, the liquid adhesive is applied onto at least one of the plate-shaped component 32 and the pressure sensitive adhesive layer 38, and the plate-shaped component 32 is bonded onto the pressure sensitive adhesive layer 38.

Also in this example, the fluctuations in cure shrinkage amount of the liquid adhesive can be absorbed by the pressure sensitive adhesive layer 38, and hence the occurrence of color unevenness in the liquid crystal display panel 10 can be suppressed. Further, the position of the plate-shaped component can be adjusted before the liquid adhesive is cured, and hence the assembling process is performed more easily.

Figure 3:
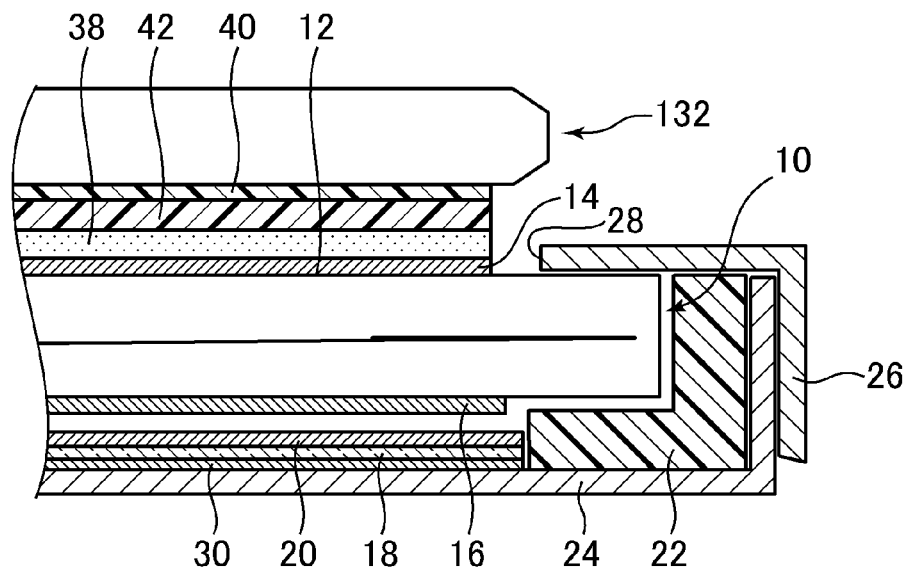
FIG. 3 is a cross-sectional view illustrating a second modified example of the embodiment of the present invention.

FIG. 3 is a cross-sectional view illustrating a second modified example of the embodiment of the present invention. The second modified example is different from the above-mentioned embodiment in that a plate-shaped component 132 is a touch panel. The other configurations correspond to the contents of the above-mentioned embodiment.

In the case where the plate-shaped component 132, which needs fine alignment particularly in the X-Y direction, is disposed on the top surface of the liquid crystal display panel 10, the embodiment of the present invention is effective because a liquid adhesive can be applied and cured after the alignment. The plate-shaped component 132 may be, not limited to a touch panel, a panel for three-dimensional display, such as a 3D lens and a 3D parallax barrier.

Figure 4:
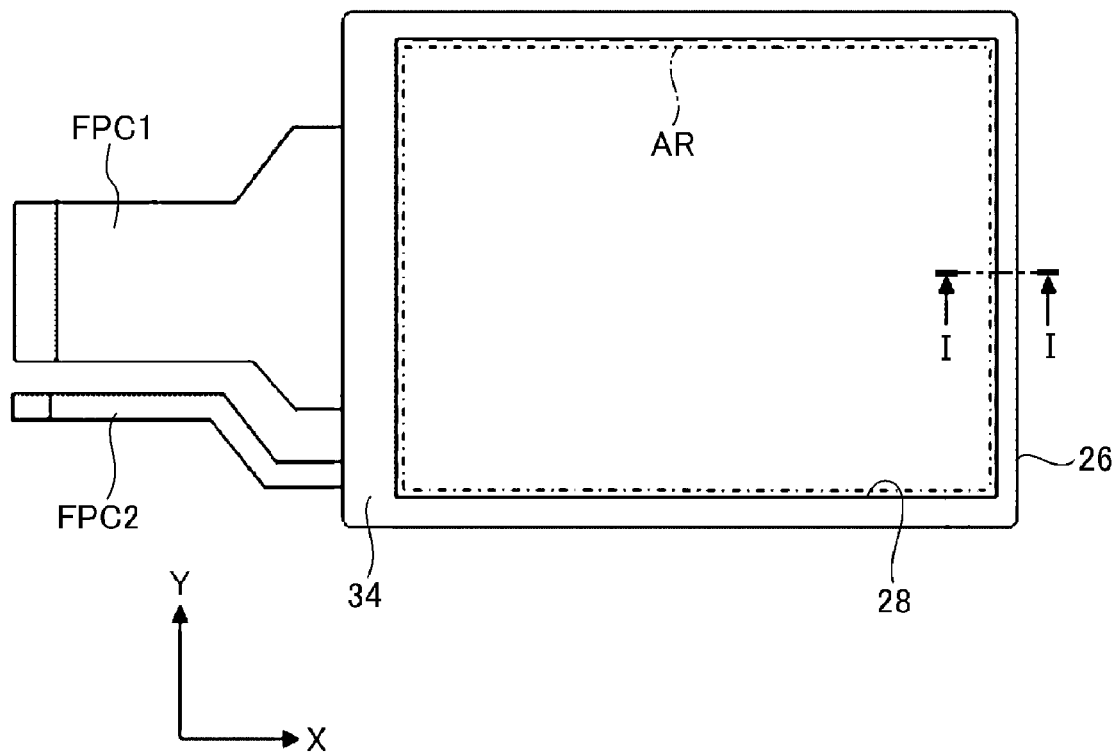
FIG. 4 is a plan view of the liquid crystal display device according to the embodiment of the present invention.

FIG. 4 is a top view of the liquid crystal display panel 10 according to the embodiment of the present invention when viewed from an image observation window side. A flexible printed circuit board FPC1 is connected to the liquid crystal display panel 10 having a display region AR, and a flexible printed circuit board FPC2 for LED is connected to the light source disposed in the backlight unit. The upper metal frame 26 has the opening 28 that surrounds the display region of the liquid crystal display panel 10. Note that, FIG. 1 is a cross-sectional view taken along the line I-I of FIG. 4.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a liquid crystal display panel;
   a plate-shaped component having a light permeable region, the plate-shaped component being disposed so as to face a display surface of the liquid crystal display panel;
   a pressure sensitive adhesive layer having light permeability, which is adhered under pressure onto the display surface of the liquid crystal display panel;
   a UV cured adhesive layer having light permeability, which is adhered onto a surface of the plate-shaped component facing the display surface, an upper surface of the UV cured adhesive layer facing away from the liquid crystal display panel is in contact with a light shielding layer and a lower surface is in contact with a resin plate; and
   the resin plate having light permeability is interposed between the pressure sensitive adhesive layer and the UV cured adhesive layer;
   wherein the pressure sensitive adhesive layer is adhered under pressure onto an entire surface of the resin plate;
   wherein the plate-shaped component, the UV cured adhesive layer, the resin plate, the pressure sensitive adhesive layer, and the liquid crystal display panel are disposed in this order; and
   wherein the plate-shaped component is mounted on the liquid crystal display panel through intermediation of the pressure sensitive adhesive layer, the resin plate, and the UV cured adhesive layer.

2. The liquid crystal display device according to claim 1, wherein the plate-shaped component comprises a plate member having light permeability, and the light shielding layer is laminated on the plate member so as to avoid facing at least a center portion of a surface of the plate member on the liquid crystal display panel side, and
   wherein the UV cured adhesive layer is adhered onto the plate-shaped component so as to cross a border between the center portion of the plate member and the light shielding layer.

3. The liquid crystal display device according to claim 1, wherein the plate-shaped component comprises a touch panel.

4. The liquid crystal display device according to claim 1, wherein the liquid crystal display panel comprises at least a polarizing plate on the display surface side, and
   wherein the pressure sensitive adhesive layer is adhered onto the polarizing plate.

5. A method of manufacturing a liquid crystal display device, comprising:
   forming a pressure sensitive adhesive layer having light permeability on a display surface of a liquid crystal display panel;
   bonding the pressure sensitive adhesive layer onto an entire surface of a resin plate having light permeability;
   bonding a plate-shaped component having a light permeable region onto the resin plate through intermediation of a liquid adhesive having light permeability disposed between the resin plate and the plate-shaped component;
   moving, before the liquid adhesive is cured, the plate-shaped component to adjust a position of the plate-shaped component; and
   curing the liquid adhesive to form a UV cured adhesive layer having an upper surface facing away from the liquid crystal display panel and in contact with a light shielding layer and a lower surface in contact with the resin plate;
   wherein the plate-shaped component, the UV cured adhesive layer, the resin plate, the pressure sensitive adhesive layer, and the liquid crystal display panel are disposed in this order, and
   wherein the plate-shaped component is mounted on the liquid crystal display panel at least through the intermediation of the pressure sensitive adhesive layer, the resin plate, the UV cured adhesive layer.

* * * * *